United States Patent
Birndorfer et al.

(10) Patent No.: US 6,523,889 B2
(45) Date of Patent: Feb. 25, 2003

(54) DEVICE FOR INFLUENCING AN AIR FLOW

(75) Inventors: Robert Birndorfer, Weilheim (DE); Helmut Höckmayr, Maisach/Gernlinden (DE); Saman Hekmat, München (DE); Stephan Schreiter, Unterbrunn (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/731,047

(22) Filed: Dec. 7, 2000

(65) Prior Publication Data

US 2001/0017479 A1 Aug. 30, 2001

(30) Foreign Application Priority Data

Dec. 7, 1999 (DE) .......................... 199 58 748

(51) Int. Cl.⁷ ................................. B60J 7/22
(52) U.S. Cl. ....................................... 296/217
(58) Field of Search ........................... 296/217

(56) References Cited

U.S. PATENT DOCUMENTS

| | | | | |
|---|---|---|---|---|
| 3,984,143 A | * | 10/1976 | Vermeulen | 296/217 |
| 4,482,183 A | * | 11/1984 | Grimm et al. | 296/217 |
| 4,738,483 A | * | 4/1988 | Boots | 296/217 |
| 5,734,727 A | * | 3/1998 | Flaherty et al. | 296/217 X |
| 5,833,305 A | | 11/1998 | Watzlwick et al. | |
| 6,082,812 A | * | 7/2000 | Lenkens et al. | 296/214 |
| 6,174,025 B1 | * | 1/2001 | Henderson et al. | 296/217 |

FOREIGN PATENT DOCUMENTS

| | | | |
|---|---|---|---|
| DE | 1 932 991 | 10/1962 | |
| DE | 1216715 | * 5/1966 | 296/217 |
| DE | 28 32 341 C2 | 1/1980 | |
| DE | 39 32 739 A1 | 4/1991 | |
| DE | 40 12 569 C1 | 5/1991 | |
| DE | 40 39 485 C1 | 5/1992 | |
| DE | 195 18 696 A1 | 11/1996 | |
| DE | 195 18 774 A1 | 11/1996 | |
| DE | 195 49 200 A1 | 7/1997 | |
| FR | 1442778 | * 5/1966 | 296/217 |
| NL | 7309886 | * 1/1975 | 296/217 |
| NL | 7811769 | * 6/1980 | 296/217 |

* cited by examiner

*Primary Examiner*—Dennis H. Pedder
(74) *Attorney, Agent, or Firm*—Nixon Peabody LLP; David S. Safran

(57) ABSTRACT

In a device for influencing the air flow in the area of the roof opening (10) of an openable motor vehicle roof with at least one wind deflector (14) which is located to be vertically displaceable in the area of the front edge of the roof opening between a neutral position in which the top of the wind deflector does not project over the fixed roof surface, and an extended position in which the top of the wind deflector does project over the fixed roof surface, the wind deflector can be selectively moved into at least one first extended position in which an air flow streaming over the motor vehicle roof (20) is routed exclusively over the top of the wind deflector, and into at least one second extended position in which an air flow streaming over the motor vehicle roof is routed at least partially under the wind deflector.

18 Claims, 4 Drawing Sheets

DEVICE FOR INFLUENCING AN AIR FLOW

BACKGROUND OF THE INVENTION

1. Field of the Invention

The invention relates to a device for influencing the air flow in the area of the roof opening of an openable motor vehicle roof with at least one wind deflector which is vertically displaceable in the area of the front edge of the roof opening between a neutral position in which the top of the wind deflector does not project above the fixed roof surface, and an extended position in which the top of the wind deflector does project above the fixed roof surface.

2. Description of Related Art

Devices of the initially mentioned type are currently being used in most vehicles with an openable roof. In such cases, the wind deflector is used primarily to deflect the air flow which streams over the motor vehicle roof during driving of the vehicle, such that the wind noise which arises when driving with the motor vehicle roof opened is reduced.

In particular, in motor vehicles with a roof opening which can be closed by means of a sliding or sliding/lifting cover, it has been shown that, especially for covers which are opened wide or completely, low frequency air vibrations are formed when opened. At certain motor vehicle speeds, the vehicle interior acts as a resonator so that air vibrations with considerable intensity can develop and they are generally perceived as very disturbing; the term "rumbling" of a sliding roof has been coined for it by specialists.

It has been found that rumbling can be at least reduced by provisions being made for swirling the air flow streaming over th e motor vehicle roof For this reason, published German Patent Application DE 195 18 696 discloses a wind deflector which is made to be raisable in the area of the front edge of the roof opening and which is provided with an air permeable net which is in its lower area in the raised position. In this way, the air flow streaming over the motor vehicle roof in vehicle operation is broken down into a portion flowing over the top edge of the wind deflector and a portion flowing through the net under the wind deflector. As a result, a boundary layer is formed between the air which is essentially at rest in the vehicle interior and the air flowing at high speed over the roof opening and beyond, and thus, the rumbling will be reduced.

However, as mentioned initially, rumbling appears disruptive only in a certain range of vehicle speeds. However, this technique would be disruptive to attainment of a wind deflector device which is optimized outside of this speed range for reducing the "normal" wind noise since this cannot be done with the wind deflector of German Patent Application DE 195 18 696 since, in every operating position of the wind deflector, a partial flow streams under the wind deflector.

SUMMARY OF THE INVENTION

Accordingly, an object of this invention is to devise a device for influencing the air flow in the area of the roof opening of an openable motor vehicle roof by means of which both largely optimum reduction or prevention of driving noise as well as largely optimum reduction or prevention of rumbling can be achieved.

This object is achieved in a device of the initially mentioned type by its being possible to move the wind deflector selectively into at least a first extended position in which an air flow streaming over the motor vehicle roof is routed exclusively over the top of the wind deflector, and into at least a second extended position in which an air flow streaming over the motor vehicle roof is routed at least partially under the wind deflector.

Thus, in the proposed device, the wind deflector can be moved, depending on the desired effect, either into the first extended position in which it is used to reduce the "normal" flow noise in the motor vehicle interior, or into a second extended position in which rumbling is prevented or at least attenuated. Preferably, the arrangement is made such that there are several first and second extended positions, especially such that the wind deflector can be adjusted continuously between the neutral position and the position of its maximum raised height.

In particular there can be an actuating arrangement for moving the wind deflector, which can comprise especially an electric motor. Here, the actuator preferably has an electronic control arrangement for triggering the electric motor depending on preadjusted or freely selectable parameters. The actuating parameters are especially the vehicle speed and the degree of roof opening, for which reason, according to one preferred embodiment of the invention, there can be sensor technology coupled to the electronic control arrangement for acquiring the motor vehicle speed and/or the degree of roof opening. The adjustment of the vertical position of the wind deflector can thus take place automatically, for example, by assigning a certain vertical position of the wind deflector to certain vehicle speed ranges depending on the degree of roof opening.

According to a preferred embodiment, between the front edge of the roof opening and the wind deflector, there is a sealing arrangement which can be joined to the wind deflector and which, in the first extended position of the wind deflector, prevents an air flow from streaming through over the motor vehicle roof under the wind deflector. Preferably, on the front edge of the roof opening, there is an essentially vertically aligned sealing surface which is assigned to the sealing arrangement. In doing so, the sealing arrangement prevents the air flowing over the motor vehicle roof under the wind deflector from flowing through over the entire engagement area of the sealing arrangement with the vertically aligned sealing surface, so that while maintaining this sealing function, the wind deflector can assume several different vertical positions, by which the reduction of wind noise can be optimized depending on, for example, the motor vehicle speed.

In another embodiment of the invention, the wind deflector can be provided with openings which, in the second extended position of the wind deflector, enable air to flow through over the motor vehicle roof under the wind deflector. In particular, the wind deflector can have opening gaps in the area between its lower edge and the sealing arrangement. By means of these openings or opening gaps, air flowing through under the wind deflector can be additionally swirled, by which the rumbling is reduced even more effectively.

The device in accordance with the invention for influencing the air flow in the area of the roof opening of an openable motor vehicle roof can be integrated into a motor vehicle roof which, in the area of the front edge of the roof opening, has a frame component such that the wind deflector, in its neutral position, is held at least partially in the frame component. Here, the configuration can be such that the wind deflector is arranged in its neutral position so that it can be lowered to under a closing element which is provided for closing and at least partially exposing the roof opening.

DETAILED DESCRIPTION OF THE INVENTION

Figure 1:
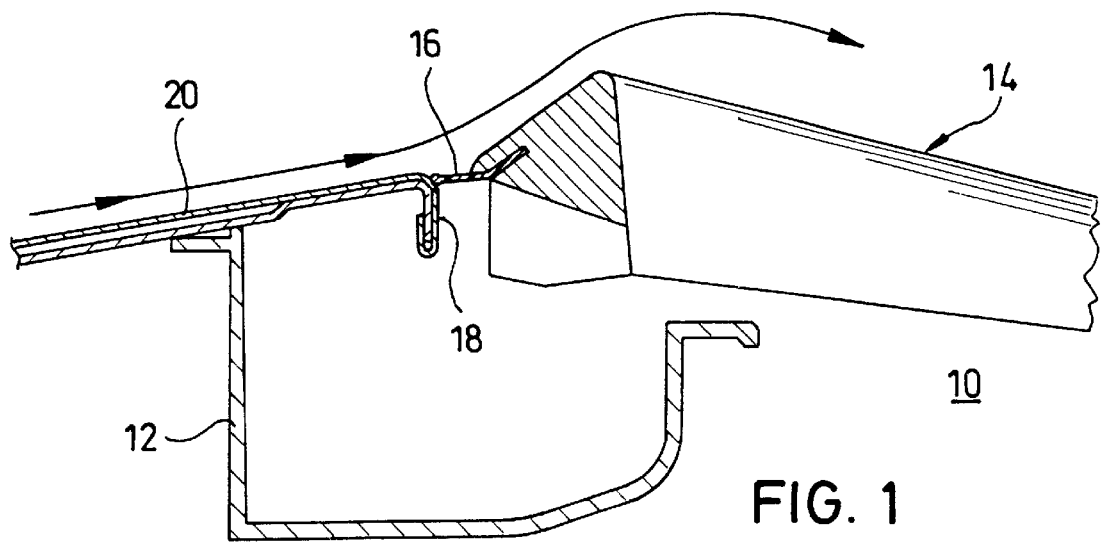
FIG. 1 is a schematic sectional view through the front edge of a roof opening, the wind deflector being in its first extended position.
Figure 4:
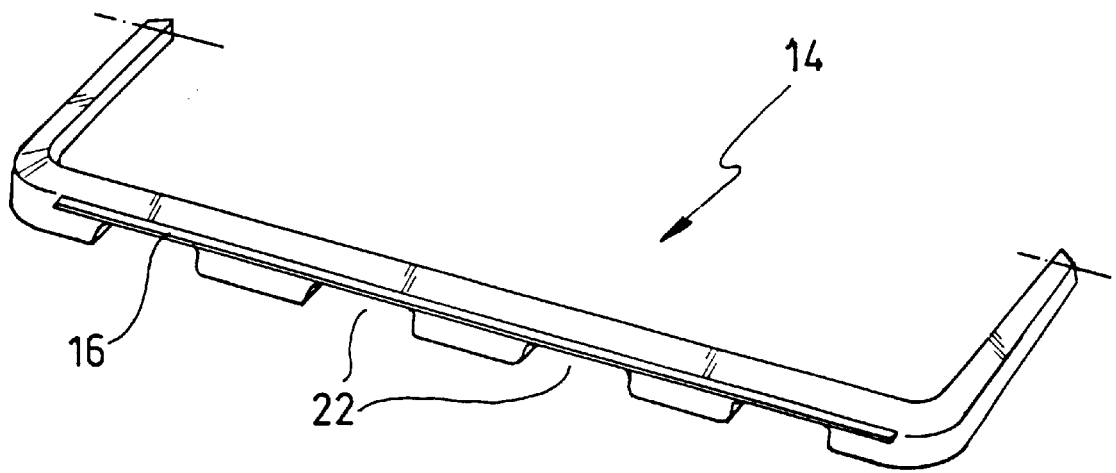
FIG. 4 is a perspective view of the wind deflector of FIGS. 1 to 3.

According to FIG. 1, which shows a section through the front edge of a motor vehicle roof opening, a wind deflector 14 is coupled in the area of the roof frame 12 which surrounds a roof opening 10 of an openable motor vehicle roof. The wind deflector, which is shown in FIG. 4 in a perspective view, in the embodiment shown in FIG. 1, is coupled on its rear end to the roof frame such that its front edge is raised when the wind deflector is raised. FIG. 1 shows the wind deflector in its first extended position in which the wind deflector reduces disturbing wind noise. Here, on the front edge of the wind deflector, there is a sealing arrangement 16 which interacts with the sealing surface 18 of the fixed roof surface 20. An air flow streaming over the fixed roof surface 20 is deflected upward by the wind deflector 14, as is illustrated by arrows in FIG. 1, the sealing arrangement 16 preventing the inflow of air between the fixed roof surface 20 and the wind deflector 14 and under the wind deflector 14. FIG. 1 shows the highest, first extended position of the wind deflector 14. The wind deflector 14 can, however, also be somewhat less raised than shown in FIG. 1, depending on, for example, the driving speed, in order to optimize the noise reduction.

As was mentioned at the beginning, depending on the degree of roof opening, i.e., in the position of a cover element or roof element which closes the roof opening, so-called rumbling occurs within a certain motor vehicle speed range. When this state arises, according to FIG. 2, the wind deflector 14 is raised further upward so that the sealing arrangement 16 disengages from the sealing surface 18 and a gap is formed between the wind deflector 14 and the fixed roof surface 20. In the preferred embodiment shown in FIG. 2, and especially in FIG. 4 in which the wind deflector 14 is provided with opening gaps 22 on its front lower edge, the air flowing over the fixed roof surface 20 can flow unhindered into the opening gaps 22 and along the bottom of the wind deflector 14 in the position shown in FIG. 2.

Figure 2:
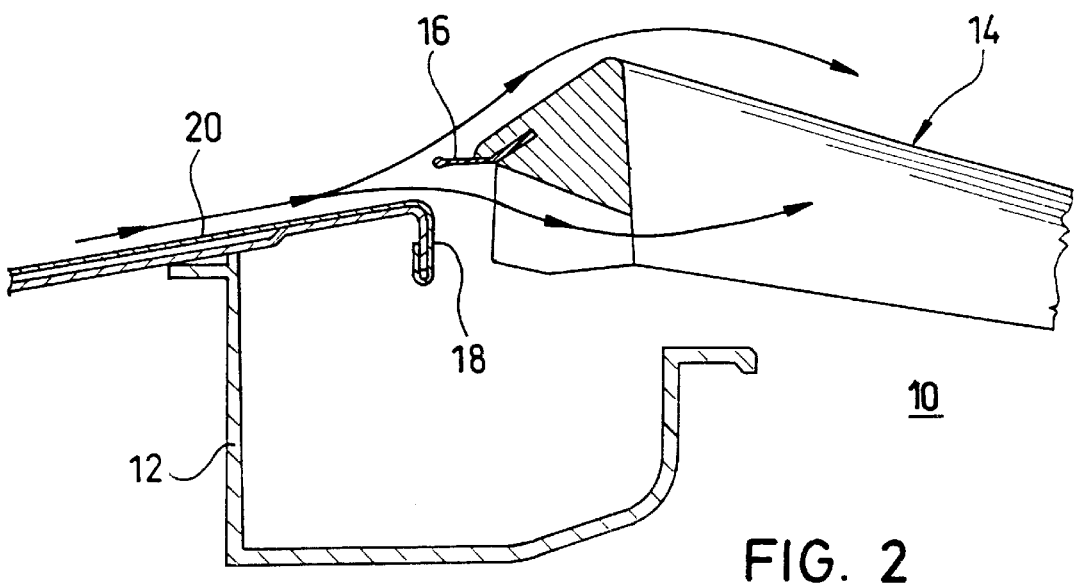
FIG. 2 is a view similar to FIG. 1, but with the wind deflector being in the second extended position.
Figure 3:
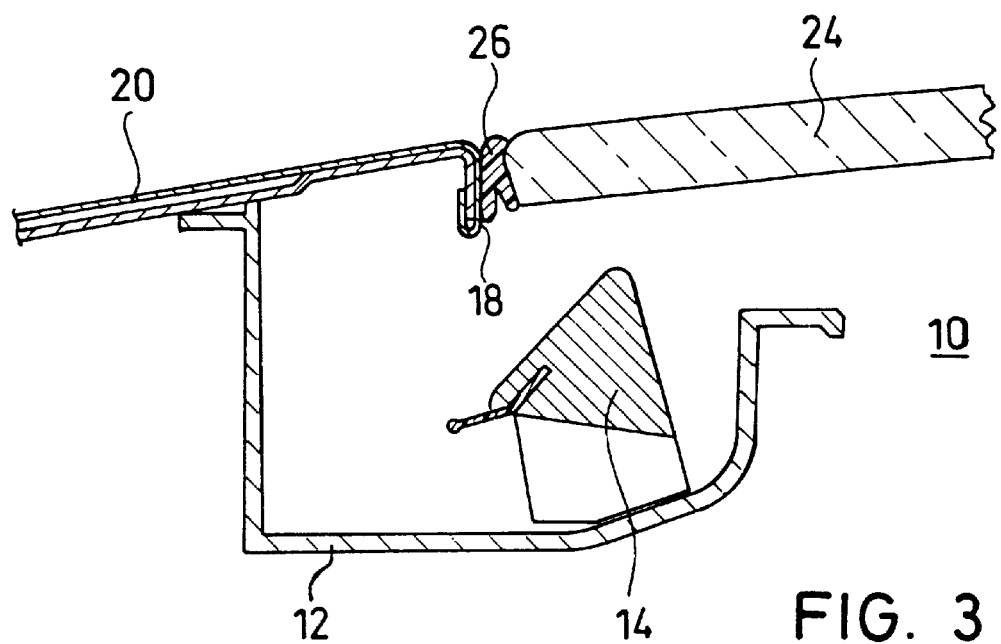
FIG. 3 shows a view similar to FIG. 1, but with the wind deflector being lowered into its neutral position.

FIG. 3 shows the wind deflector 14 from FIGS. 1 & 2 when it has been lowered into its neutral (inactive) position in the front roof frame 12. Here, the wind deflector 14 is lowered so far that the cover element 24 which is provided for closing the roof opening 10 can slide unhindered above the wind deflector 14 until its sealing arrangement 26, which is provided on its front edge, rests against the sealing surface 18 of the fixed roof surface 20.

FIG. 4 is a perspective view of the wind deflector 14 in which the opening gaps 22 provided on the bottom of the wind deflector 14 can be easily recognized. These opening gaps 22, or the wind deflector areas which lie between the opening gaps, provide for swirling of the air flowing in under the wind deflector 14, by which the rumbling noise is still further reduced. Instead of the opening gaps 22 shown in FIG. 4, the wind deflector 14 can also be provided with recesses located under the seal 16, or the seal 16 itself can be shaped such that it causes the desired swirling effect.

Figure 5:
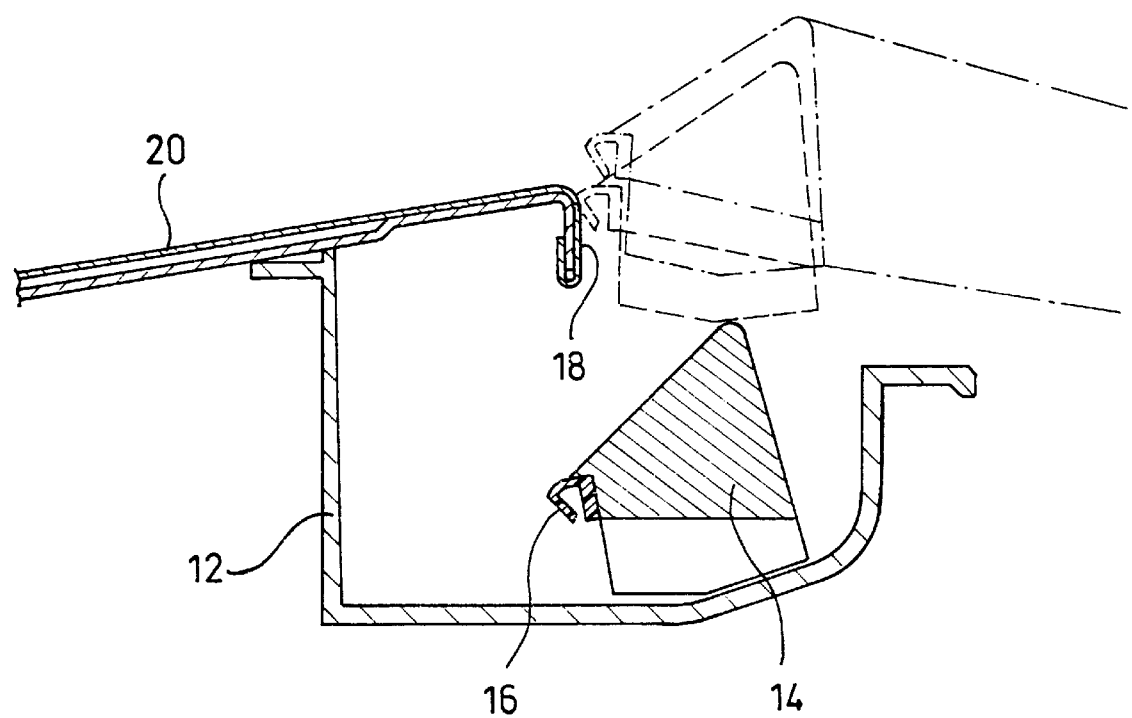
FIG. 5 is a schematic sectional view through the front edge of the motor vehicle roof opening, an alternative embodiment of the wind deflector being shown both in its neutral position and also in its first and its second extended position.

In FIG. 5, a modified embodiment of the wind deflector 14 is shown in both the neutral position and also in the first and second extended position. While in FIGS. 1 to 3, a seal 16 is shown which is attached to the wind deflector 14 such that it projects essentially perpendicular to the sealing surface 18 of the fixed roof opening 20, there is a seal 16 in the version shown in FIG. 5 which has a downwardly bent sealing flange. It goes without saying that no limits are imposed on the configuration of the seal. The seal 16 preferably adjoins the sealing surface 18, forming a seal over the entire width of the roof opening 10.

Figure 6:
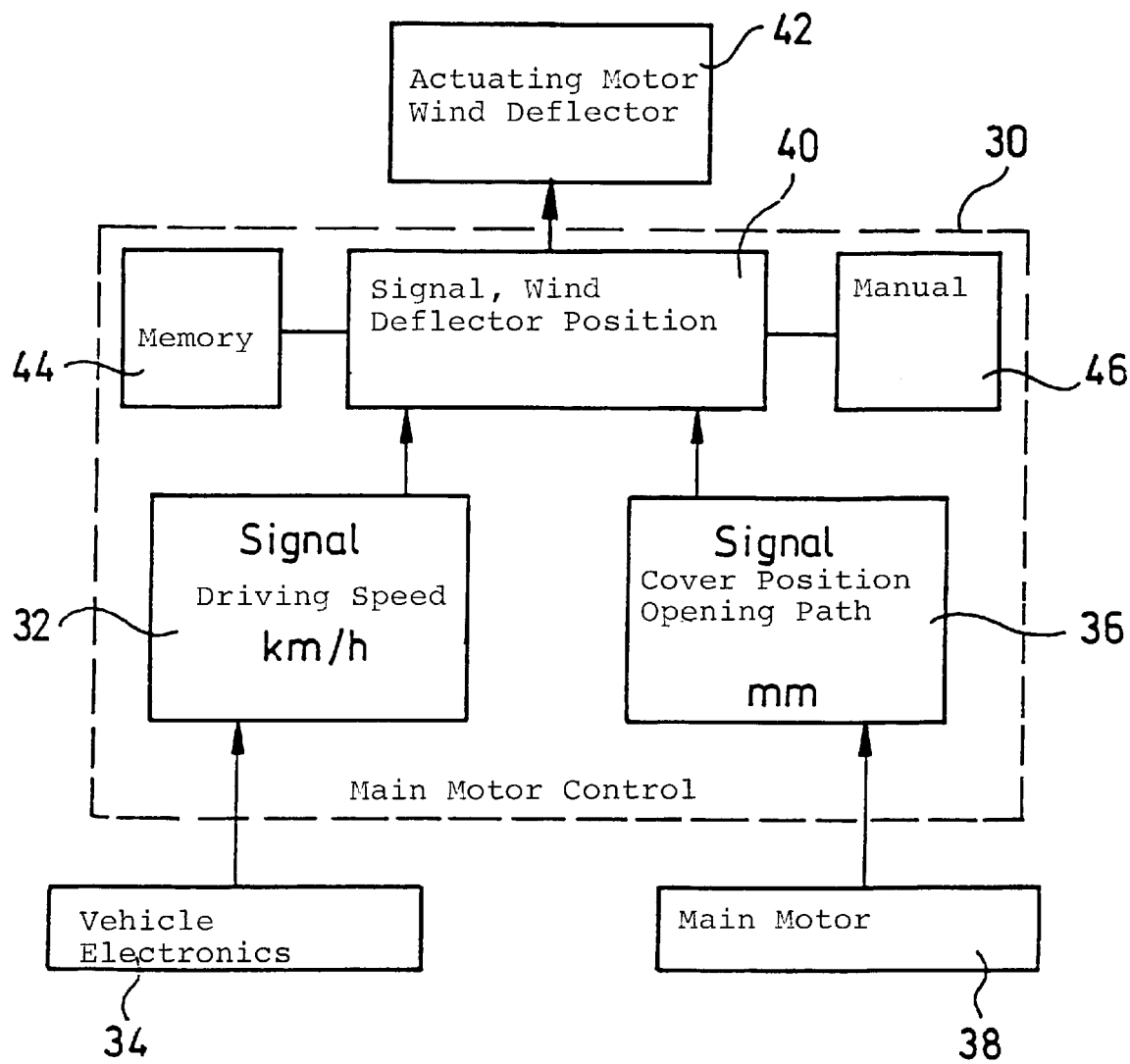
FIG. 6 is a schematic block diagram of an actuator arrangement for electronically controlling vertical adjustment of the wind deflector.

FIG. 6 shows a schematic diagram of an actuator arrangement for electronic control of the vertical location of the wind deflector. The control electronics 30 comprises sensor technology 32, e.g., for acquiring the motor vehicle speed, and a speed signal can optionally be derived directly from the vehicle electronics 34 since, in many current types of motor vehicles, an electrical vehicle speed signal is produced anyway. Furthermore, the control arrangement 30 also comprises sensor technology 36 for acquiring the degree of roof opening. Preferably, the sensor technology 36 is coupled to a motor 38 which controls the motion of a closing element for closing the roof opening.

Using the signals which have been provided by the sensor technology 32 and sensor technology 36, a signal processing unit 40 determines the vertical position of the wind deflector which is optimum for reducing both wind noise and also rumbling, and it issues a position signal which is delivered to the actuator motor 42. The wind deflector can be triggered, here, according to predetermined functions into which the vehicle speed and cover position are incorporated, or using predetermined tables of values in which, depending on the cover position, discrete degrees of vertical adjustment are assigned to certain speed ranges. If it is assumed that, for example, in the speed range from 50 to 100 km/h strong rumbling noise occurs, the control can provide for the wind deflector being raised into the second extended position as is shown in FIG. 2 in the speed range from 50 to 100 km/h; conversely, the wind deflector 14 is raised into the first extended position at vehicle speeds outside this range. In doing so, the control can be chosen, for example, such that the wind deflector in the speed range from 0 to 50 km/h is in the first extended position (see FIG. 1), that in the speed range from 100 to 150 km/h it is lowered from the position shown in FIG. 1 by roughly 5 mm, while in the speed range from 150 to 250 km/h it is lowered by roughly 10 mm from the position which is shown in FIG. 1. Since the optimum position of the wind deflector 14 depends on the geometrical circumstances of the motor vehicle roof in which the wind deflector is being used, the control arrangement 30 preferably has a memory 44 which can be provided with the respective vehicle data or the actuating functions which are optimum for the given motor vehicle. In this way, the same wind deflector device can be used in different vehicle types or versions of a vehicle type, and can be matched optimally to the respective circumstances. Furthermore if desired, the control arrangement 30 can also have an arrangement 46 to manually override the electronically generated position signal, and thus, enable the vehicle user to individually set the vertical position of the wind deflector.

The wind deflector concept described here combines the advantages of a known solid profile wind deflectors with the advantages of the gap wind deflectors, i.e., of wind deflectors which do not have a continuous uniform profile over the entire width of the wind deflector, but are provided with openings or with gaps on its top and bottom by forming a combination of these two basically different types of wind deflectors, in which the wind deflector selectively executes the function of one or the other type of wind deflector. The part of the wind deflector which lies above the sealing arrangement 16, i.e., the wind guide surface, is a solid profile wind deflector with straight, convex, or concave wind guide surface. Underneath the sealing arrangement, the wind deflector 14 has a continuous recess, but preferably opening gaps as shown in FIG. 4, or a similar arrangement by means of which an air flow streaming under the wind deflector is swirled.

What is claimed is:

1. Device for influencing the air flow in the area of a roof opening in a fixed roof surface of an openable motor vehicle roof, comprising at least one wind deflector which is vertically displaceable, in an area of a front edge of the roof opening, between a neutral position in which a top of the wind deflector does not project above the fixed roof surface, and an extended position in which the top of the wind deflector does project above the fixed roof surface,
wherein the wind deflector is selectively movable into at least one stationary first extended position in which an air flow streaming over the motor vehicle roof is routed exclusively over the top of the wind deflector, and into at least one stationary second extended position in which an air flow streaming over the motor vehicle roof is routed at least partially under the wind deflector, and
wherein the wind deflector is provided with openings which enable air flowing over the motor vehicle roof to flow under the wind deflector in said at least one second extended position of the wind deflector.

2. Device as claimed in claim 1, further comprising an actuator arrangement for moving the wind deflector.

3. Device as claimed in claim 2, wherein the actuator arrangement comprises an electrical actuator motor.

4. Device as claimed in claim 3, wherein the actuator has an electronic control arrangement for triggering the actuating motor based on one of preadjusted and freely selectable parameters.

5. Device as claimed in claim 4, wherein sensor technology coupled to the electronic control arrangement for detecting at least one motor vehicle speed and degree of opening of the roof.

6. Device as claimed in claim 1, wherein a sealing arrangement is provided between the front edge of the roof opening and the wind deflector, the sealing arrangement preventing an air flow streaming over the motor vehicle roof from flowing under the wind deflector in said at least one first extended position of the wind deflector.

7. Device as claimed in claim 6, wherein the sealing arrangement is joined to the wind deflector.

8. Device as claimed in claim 7, wherein there is an essentially vertically oriented sealing surface on the front edge of the roof opening, against which the sealing arrangement is engageable.

9. Device as claimed in claim 6, wherein the openings are in an area between a lower edge of the wind deflector and the sealing arrangement.

10. Motor vehicle roof with a device for influencing the air flow in the area of a roof opening in a fixed roof surface of an openable motor vehicle roof, comprising at least one wind deflector which is vertically displaceable, in an area of a front edge of the roof opening, between a neutral position in which a top of the wind deflector does not project above the fixed roof surface, and an extended position in which the top of the wind deflector does project above the fixed roof surface,
wherein the wind deflector is selectively movable into at least one stationary first extended position in which an air flow streaming over the motor vehicle roof is routed exclusively over the top of the wind deflector, and into at least one stationary second extended position in which an air flow streaming over the motor vehicle roof is routed at least partially under the wind deflector,
wherein the wind deflector is provided with openings which enable air flowing over the motor vehicle roof to flow under the wind deflector in said at least one second extended position of the wind deflector, and
wherein a frame component is provided in the area of the front edge of the roof opening which at least partially holds the wind deflector in said neutral position.

11. Motor vehicle roof as claimed in claim 10, further comprising a cover element for closing and at least partially exposing the roof opening; and wherein the wind deflector is arranged below the cover element in said neutral position.

12. Device for influencing the air flow in the area of a roof opening in a fixed roof surface of an openable motor vehicle roof, comprising at least one wind deflector which is vertically displaceable, in an area of a front edge of the roof opening, between a neutral position in which a top of the wind deflector does not project above the fixed roof surface, and at least two extended positions in which the top of the wind deflector does project above the fixed roof surface; wherein the wind deflector, in a first of said extended positions, causes an air flow streaming over the motor vehicle roof to be routed exclusively over the top of the wind deflector, and in at least one second extended position, causes an air flow streaming over the motor vehicle roof to be routed at least partially under the wind deflector; and wherein said at least one second extended position is located above said first extended position.

13. Device as claimed in claim 12, further comprising an actuator arrangement for moving the wind deflector.

14. Device as claimed in claim 13, wherein the actuator arrangement comprises an electrical actuator motor.

15. Device as claimed in claim 14, wherein the actuator has an electronic control arrangement for triggering the actuating motor based on one of preadjusted and freely selectable parameters.

16. Device as claimed in claim 14, wherein sensor technology is coupled to the electronic control arrangement for detecting at least one motor vehicle speed and degree of opening of the roof.

17. Device as claimed in claim 12, wherein a sealing arrangement is provided between the front edge of the roof opening and the wind deflector, the sealing arrangement preventing an air flow streaming over the motor vehicle roof from flowing under the wind deflector in said at least one first extended position of the wind deflector.

18. Device as claimed in claim 17, wherein the sealing arrangement is joined to the wind deflector.

* * * * *